United States Patent Office 2,978,451
Patented Apr. 4, 1961

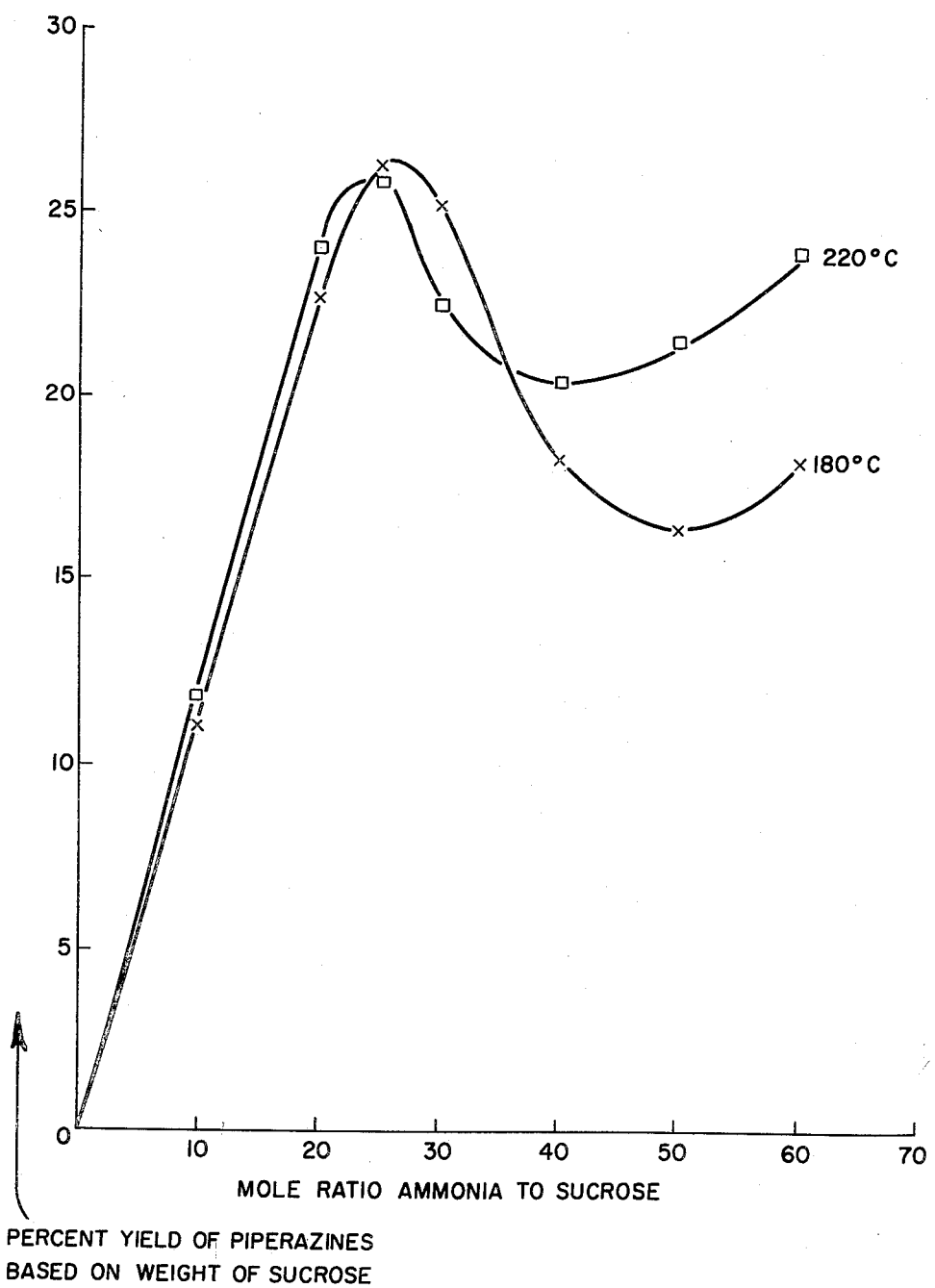

2,978,451
PROCESS FOR THE PREPARATION OF PIPERAZINES

Henry B. Hass, Summit, N.J., and Philip S. Skell, State College, Pa., assignors, by mesne assignments, to Research Corporation, New York, N.Y., a corporation of New York Filed July 8, 1959, Ser. No. 825,699

12 Claims. (Cl. 260—268)

This application is a continuation-in-part of our co-pending application, Serial No. 573,314, filed March 23, 1956, now abandoned, which is in turn a continuation-in-part of our earlier application, Serial No. 436,256, filed June 11, 1954, now abandoned.

The present invention relates to a novel method for preparing both new and known chemical compounds which are utilizable as industrial chemicals and fine chemicals by the chemical and pharmaceutical industries. More particularly, this invention relates to a process for reductive aminolysis, otherwise describable as concurrent hydrogenation and aminolysis, whereby oxygen-containing organic compounds, such as the carbohydrates, including saccharides, and other polyhydroxy and polyoxygenated compounds, are cleaved at some of the carbon-carbon linkages, hydrogenated and aminated in an efficient single-stage, commercially-feasible process employing prescribed conditions to provide new chemical derivatives of the starting materials.

It is an object of the present invention to provide a novel, single-stage process for converting certain naturally occurring, oxygen-containing organic chemicals which are in abundant supply and relatively inexpensive into nitrogen-containing, heterocyclic organic chemicals (containing nitrogen and carbon in a cyclic group) which are relatively expensive and not as readily available as the starting materials.

It is another object of the the present invention to provide a novel and improved process for producing nitrogen-containing heterocyclic derivatives of carbohydrates and vicinal polyhydroxy compounds, in particular, piperazine and substituted piperazines.

It is a further object of the present invention to provide a novel single-stage, commercially-practical process for preparing nitrogen-containing heterocyclic derivatives of vicinal polyhydroxy compounds which have heretofore been unobtainable from these starting materials.

Additional objects of the invention will be apparent to those skilled in this art from reading the specification which follows taken in conjunction with the accompanying drawing in which: Fig. 1 is a graph showing the relationship of yield of piperazine compounds produced by the process of the invention with respect to mole ratios of ammonia to sucrose.

The prior art is familiar with hydrogenolytic processes which enable one to hydrogenate simultaneously certain polyoxygen-containing organic chemicals, such as the sugars and the polyhydroxy alcohols, and also to cleave or split the starting materials at some of the carbon-carbon linkages thereby producing hydrogenated derivatives of lower molecular weight (i.e., having a smaller number of carbon atoms). These processes are referred to by the term "hydrogenolysis" and are distinguished from simple hydrogenation in that there is a splitting of some of the carbon-carbon linkages in addition to the hydrogenation.

The present invention is concerned with a one-stage process which produces simultaneously hydrogenation, splitting of some of the carbon-carbon linkages of carbon chains containing more than 3 carbon atoms, and amination of the starting material to produce nitrogen-containing heterocyclic derivatives which were heretofore not readily obtainable by the prior art methods of hydrogenolysis. Also, the process of the invention makes it possible to produce compounds which could not otherwise be produced from these sctarting materials. The process of the present invention will hereinafter be referred to as a "reductive aminolysis" process.

Reductive aminolysis is not per se a new type of process, an early form of such process having been described in British patent specification No. 449,474, of June 22, 1936, of I.G. Farbenindustrie A.G. In accordance with the process of that patent specification a saccharide is heated with hydrogen and ammonia or an aliphatic amine in the presence of a hydrogenation catalyst. Little is said about the relative proportion of amine or ammonia employed and in no case is the amount greater than 3.3 moles of ammonia or 2.3 moles of amine for each 100 grams of saccharide. Little is said about the character or quantity of hydrogenation catalyst employed. In a number of the examples the suggestion is made to employ 10% of a nickel catalyst based upon the weight of the saccharide. Nothing is said about the reactivity of the catalyst, which at the time of the specification was less active than those presently available. In accordance with the process of this British specification the products obtained are predominantly the alkyl substituted propylene diamines in which the 3-carbon atom fragment of the propylene diamine is produced from the saccharide. Additionally, undesirable high boiling, high molecular weight materials are frequently obtained in large quantities. Nothing is said about obtaining nitrogen heterocyclic compounds, such as the piperazines. So far as we are presently aware, the process described in the British specification has never been placed in commercial operation.

The reductive aminolysis process of the present invention is conducted by treating a vicinal polyhydroxy compound, desirably a carbohydrate, such as saccharides, starting material with hydrogen under super-atmospheric pressures at elevated temperatures in the presence of the prescribed quantity of a source of nitrogen, including ammonia or a basic primary amine, as indicated hereinbelow, and a sufficient quantity of a relatively active hydrogenation catalyst.

By means of our process we are able to obtain high yields of the ring-containing, nitrogen heterocyclics, such as the piperazines and substituted piperazines. Only relatively insignificant and low yields of unwanted high boiling, high molecular weight by-products are obtained.

The process is desirably carried out at a temperature capable of producing splitting of some of the carbon-carbon linkages of the vicinal polyhydroxy starting compounds under the conditions of the reaction, such as between about 150° and 300° C., and preferably between about 180° and 250° C. It is preferred to employ a temperature as high as practical without producing an undue degree of unwanted charring or darkening of the reaction components. It has been discovered that temperatures in excess of 150° C. will produce splitting of the carbon-carbon linkages but, where a higher degree of cleavage or a more rapid rate of splitting is desired, it is advantageous to employ higher temperatures. Thus it is usually preferred to employ a temperature within the range of 200° to 250° C. Temperatures in the order of 300° C. normally produce rapid cleavage of the carbon-carbon linkages but, when this temperature is exceeded by a substantial degree, unwanted amounts of charring and gasification are prone to occur.

The pressure under which the reaction may be conducted should be from about 750 to 15,000 lbs. per sq. in., and preferably between about 1,000 to 5,000 lbs. per sq. in. These pressures are those recorded during the conduct of the process itself and refer to the pressures obtained at the temperature of the process. The pressure of the reaction may be permitted to diminish as the course of the reaction proceeds and the hydrogen gas reacts with the starting material. This may be accomplished by employing a closed, constant-volume system and beginning with a pressure of a higher order which is permitted to diminish as the hydrogen gas, which is used to charge the reaction vessel and creates most of the pressure, is utilized in the course of the reaction. With some types and volume of the equipment, the pressure may decrease in the order of about 1,000 lbs. or more per sq. in. in the course of the reductive aminolysis. The diminution of pressure is greatly dependent upon the head-space in the reaction vessel above the reactants. The larger the head-space in relation to the liquid and solid starting materials, the lower will be the decrease in pressure during the course of the reaction.

As an alternative, additional amounts of hydrogen gas may be introduced during the course of the reaction to replace that which is utilized or absorbed during the process.

The process of the present invention may be conducted batch-wise or by continuous operations, as desired. Where continuous operations are desired, techniques with which those skilled in the hydrogenation art are familiar may be employed.

The vicinal polyhydroxy organic compounds which are amenable to the reductive aminolysis process of the invention include many materials with which the organic chemist is well familiar. Many of these materials are naturally-occurring agricultural products available in superabundance and for which the agricultural chemist has long sought commercial applications to exhaust the oversupply of these materials. Many of these materials are by-products for which no industrial application is known and in some cases there is no adequate agricultural, industrial or other application for these materials. Consequently, a number of these starting materials may be classified as unwanted by-products. The present process provides a means of efficiently utilizing these materials to produce in good yields highly useful and relatively expensive nitrogen heterocyclic compounds, such as the piperazines.

Among the vicinal polyhydroxy materials (having hydroxyl groups on adjacent carbon atoms) which may be subjected to the reductive aminolysis process of the invention are those materials broadly classified as carbohydrates, such as the saccharides. Falling within this classification are the polysaccharides, including the pentosans, such as the arabans (anhydrides of arabinose) and xylans (anhydrides of xylose); the hexosans, such as the glucans which include starch, cellulose, mannans (anhydrides of mannose), fructans (anhydrides of fructose), polyuronides, such as pectins; the disaccharides and monosaccharides which are obtained naturally and synthetically, including sucrose, xylose, arabinose, maltose, galactose, lactose, glucose, fructose, etc. The monosaccharides may fall either into the hexose or pentose categories as well as those having other numbers of carbon atoms, and they may be of the aldose or ketose types. Other vicinal polyhydroxy derivatives of the hydrocarbon compounds, such as glycerol; the glycols, such as propylene glycol and ethylene glycol; the four carbon atom glycols, including diethylene glycol; aldol; the higher polyhydroxy alcohols, such as erythritol, sorbitol, mannitol, etc., may be used. Mixtures of these materials can be satisfactorily employed. Desirably, the vicinal polyhydroxy compound shall contain at least six carbon atoms. To date best results have been obtained using glucose, sucrose, starch and propylene glycol as the starting materials. Sucrose is preferred.

As a matter of economy it is often desirable to employ crude and impure forms of the polyoxygenated starting materials as they occur naturally, or as they are obtained as by-products from industrial processes. Thus where sucrose or dextrose is the selected starting material for use in the process of the invention, such crude and impure forms of these products as corn sirup, hydrol sirup, citrus molasses, beet and cane sugar sirups and invert sugar solutions may be employed. Where a starch is selected as the starting material, somewhat impure forms of the starches which occur naturally may be employed, such as potato in finely-divided form, finely-divided corn and other grains as well as the somewhat purified starch produced from the grains. In addition to the above materials, many of the naturally-occurring forms of cellulose may be employed such as sugar cane bagasse, bagasse pith, sugar beet pulp; other agricultural wastes such as corn stalks, corn cobs, straw, oat hulls, and cottonseed hulls; the waste products from the pulp and paper industry such as hemicelluloses and lignin; as well as bark and sawdust from the lumber industry.

It is advantageous to reduce insoluble starting materials to a finely-divided state for employment in the process of the invention. This provides a maximum of surface area and consequently permits a more rapid and efficient reductive aminolysis.

The amount of water which may be present in the reaction mixture may vary over wide ranges from initially anhydrous conditions to somewhat dilute reaction mixtures. Best results are obtained where some water is present. We prefer to have present a quantity of water which is equal to the amount of polyhydroxy starting material up to about 3 times as much water when the source of nitrogen is a low boiling substance such as ammonia or the methylamines.

The ammonia employed as a source of nitrogen in the process of the invention may be in liquid anhydrous form or in reasonably concentrated aqueous solutions. It is contemplated that the ammonia may serve as the liquid medium for the reaction mixture. Concentrated aqueous ammonia which is available commercially as a solution having a specific gravity of about 0.90 and which contains about 26% ammonia is satisfactory. Also, one may use gaseous ammonia, in which case the ammonia will be condensed to liquid form when the reaction mixture is subjected to pressure. The more concentrated aqueous forms of ammonia are preferred. Although ammonia has a critical temperature of 133° C., the presence of water, molten sucrose, hydrogenolysis products, including those from a previous hydrogenation, or a previous reductive aminolysis etc., may serve to maintain a liquid phase at reaction conditions.

In place of or in addition to ammonia per se as the source of nitrogen, one may employ a basic primary amine, and preferably a basic aliphatic primary amine, in conducting the reductive aminolysis of the invention. The primary amine must be at least as basic as ammonia or convertible to an amine as basic as ammonia during the process of the invention.

Examples of the basic primary amines are: such alkyl amines as methylamine, ethylamine, n-propylamine, etc.; alkanolamines, such as ethanolamine and propanolamine; other of the primary amines may be employed, such as the polybasic amines: ethylenediamine, propylenediamine, tetraethylenepentamine, etc. Aralkylamines, such as benzylamine, may be used. Cyclic amines, such as cyclohexylamine, may be used. Primary aromatic amines, such as aniline, may be used as these materials are generally converted to the corresponding cycloaliphatic amine, such as cyclohexylamine, during the course of the process. Additionally, one may employ neutral, acidic or basic substances which will produce basic primary amines under the conditions of the process such, as for example, nitriles and amides, such as urea, formamide, acetamide, etc.

It is not necessary that the amine reagents be of exceptional purity and these may be introduced in the form of industrial by-products. In some cases it may be feasible to introduce these reagents as crude mixtures of amines.

The nature of the amine employed will, of course, have a bearing upon the nature of the final nitrogen-containing organic chemicals obtained by the process. When ammonia is employed as the source of nitrogen the yields obtained are predominantly piperazine and 2-methylpiperazine. Where a primary amine is employed the product is predominantly an N,N'-disubstituted piperazine, where the substituents are the residue of the amine employed. An alkanolamine produces predominantly piperazines.

In order to obtain high yields of nitrogen heterocyclic compounds employing the process of the invention, we have discovered that it is necessary to employ larger ratios of ammonia or basic primary amine to vicinal polyhydroxy compound than has been employed by the prior art, including British specification No. 449,474 and to employ greater hydrogenation catalyst activity than has been heretofore employed. Most important is the ratio of nitrogenous starting compound to vicinal polyhydroxy starting compound.

To obtain high yields of nitrogen heterocyclic compounds, such as piperazine and substituted piperazines, it is desirable that ammonia or a basic primary amine be employed in a quantity of at least about one, preferably at least 1.2, gram atom of nitrogen per carbon atom of starting vicinal polyol. Preferably, between about 1.66 and 2.5 gram atoms of nitrogen (in the form of ammonia or a basic primary amine) per carbon atom of polyol are employed. In the case of ammonia, at least one mole of ammonia should be employed per carbon atom of vicinal polyol. When employing ammonia and surcose as starting materials, it is desirable to employ a molar ratio of ammonia to sucrose of at least 14:1, preferably between about 20:1 and 30:1, although a ratio of 40:1 may be employed. The maximum amount of ammonia or amine which may be employed is not of great significance, but chemical economics militate against the use of substantial excesses.

The effect of the ratio of ammonia or basic primary amine to vicinal polyhydroxy compound upon the yield of piperazine and substituted piperazines is shown by the graph of Fig. 1 of the appended drawing. In that graph are two curves showing the percent yields of piperazines (based on amount of sucrose used) obtained with various mole ratios of ammonia to sucrose. One curve shows the results obtained when conducting the process at a temperature of about 180° C. and the other at about 220° C. As shown in the graphs, the yield of piperazines increases dramatically as the mole ratio of ammonia to sucrose is increased until a ratio of about 25:1 is reached, after which the yields are reduced slightly.

The results illustrated by the graph of Fig. 1 are surprising and unexpected. The higher ratios of ammonia produce higher yields of piperazines, which contain less nitrogen than linear polyamines. One would have anticipated that the higher ratios of ammonia would produce higher yields of linear polyamines and lower yields of piperazines; yet the opposite occurs.

In order to provide high yields of the piperazines, it is also important that a sufficient quantity of relatively active hydrogenation catalyst be employed. Sufficient catalyst should be employed to provide an initial rate of hydrogen absorption of at least 1, and preferably at least 5, gram moles of hydrogen per hour per kilogram of polyhydroxy compound used. Slower rates of hydrogen absorption produce relatively little piperazines and larger amounts of undesirable higher molecular weight, high boiling materials. The initial rate of hydrogen absorption is that which takes place during the initial stages of the reaction. In a closed system, constant volume, batch operation, the rate of hydrogen absorption will decline substantially during the course of the reaction. Consequently, it is contemplated that the initial rate of hydrogen absorption will be measured during the first 10% of the time required to complete substantially the absorption of hydrogen. In the case of continuous operations the rate of hydrogen absorption must be maintained at a level above the lower limit.

The rate of hydrogen absorption may be calculated from the drop in pressure in a constant volume, closed system, or by other means with which those skilled in the art are familiar.

The hydrogenation catalyst may be one of those which persons skilled in hydrogenation art are familiar, such as the metal-containing hydrogenation catalysts of nickel, including Raney nickel, Spongy nickel, supported nickel catalysts, such as nickel on carbon, etc. Also, catalysts of chromium, copper and cobalt in various forms may be used, such as copper-chromium oxide. Additionally, other well known hydrogenation catalysts, such as platinum, rhodium, etc., may be used, if desired, although these precious metal catalysts suffer from the disadvantage of being costly. To date best results have been obtained with nickel catalysts. One such catalyst is Spongy nickel purchased from Davison Chemical Corp., which is its brand of Raney nickel, or other well known forms of Raney nickel produced by well known methods from nickel-aluminum alloys.

In case the raw material has a considerable sulfur content (such as concentrated waste sulfite liquors) this must first be removed to avoid poisoning the catalyst, or, alternatively, a catalyst such as molybdenum sulfide may be used which is not adversely affected by such compounds.

In general, the reductive aminolysis process of the present invention is conducted by heating together at a "cracking" temperature, and under pressure, the polyhydroxy compound, the ammonia or primary amine, the hydrogen and the hydrogenation catalyst in suitable pressure reaction equipment. The heating of the reaction mixture is desirably continued for a period during which a substantial decline in pressure may be observed until a nearly constant value is obtained. The reaching of a substantialy constant pressure is indicative of a utilization of the hydrogen gas as a consequence of the reductive aminolysis and demonstrates conclusion of the reaction. The reaction mixture is cooled to substantially room temperature and the pressure released. The reaction products are isolated from each other by fractional distillation, initially at atmospheric pressure and subsequently under vacuum as the boiling points of the fractions increase. The composition of reaction products of the process of the present invention will depend somewhat upon the nature of the polyhydroxy starting material and whether ammonia or a primary amine is used as the nitrogenous starting material. The specific nature and concentrations of the reaction products will also be somewhat dependent upon the temperature and pressure conditions employed during the reaction. The higher the temperature and the pressure, the lower will be the average molecular weight of the resulting products. If desired, the reaction products, and particularly the higher boiling fractions, may be recycled in the process to obtain additional quantities of lower boiling products.

The exact mechanism or principle by which the reductive aminolysis process of the present invention operates is not known to us. It is apparent, however, that the process combines in a single-stage procedure a cleavage at certain of the carbon-carbon bonds of the starting material, hydrogenation and amination. Possibly in some cases molecular rearrangement takes place. The process of the invention permits one to start with vicinal polyhydroxy compounds and produce from them yields which are predominantly nitrogen-containing heterocyclic compounds, and preferably a piperazine, with some of the ethylenediamines. Thus it is possible to produce nitrogen compounds having no oxygen atoms in the molecule, Such compounds are ethylenediamine, piperazine, 2-methylpiperazine, dimethylpiperazines, tetramethylethylenediamine, etc. Thus if the reduction or hydrogenation phase of the process of the invention is carried out far enough, all of the oxygen atoms will be removed from the hydroxy starting material. Such final compounds as these are extremely useful as chemical intermediates and reagents in the chemical and pharmaceutical industries and are produced by the process of the present invention at relatively low cost. In addition to these final products, it is possible to obtain numerous other nitrogen compounds which are also useful.

In order more clearly to disclose the nature of the present invention, specific examples illustrating the process of the invention will hereinafter be described. It should be understood, however, that this is done solely by way of example and is intended neither to delineate the scope of the invention nor limit the ambit of the appended claims. Unless otherwise stated, quantities of materials are referred to in terms of parts by weight.

*Example 1*

About 150 grams of sucrose, 150 ml. of water, 350 grams of liquid anhydrous ammonia and 23 grams of Spongy nickel catalyst (a form of Raney nickel) were charged into a stainless-steel lined pressure reaction vessel of 2.3 liters capacity having about 1.7 liters of free space above the level of the liquid reaction mixture and which was equipped with agitation means. Hydrogen gas was introduced into the reactor until the pressure of the system reached about 1,080 lbs. per sq. in. when measured at 18° C. Heat was applied steadily until the temperature of the reaction mixture reached about 192° C. At this temperature the pressure rose initially to about 3,240 lbs. per sq. in., but by measuring the change of pressure with temperature at lower temperatures it was estimated that the pressure would have been 3,385 lbs. per sq. in. at 203° C. had no reaction taken place during the time necessary to reach this temperature. Five minutes later the temperature was 203° C. and the pressure had dropped to 3,250 lbs. per sq. in. The initial rate of hydrogen uptake was calculated to be about 32 moles per hour per kilogram of sucrose. The temperature was maintained at about 200° C. and the mixture agitated for about ¾ hour, during which time the pressure gradually decreased and finally became almost constant at approximately 2,400 lbs. per sq. in. The relative constancy of the pressure indicated the substantial termination of the reaction. The reaction product was cooled to room temperature (18° C.) at which time the pressure was 690 lbs. per sq. in., and the pressure released. The suspended nickel catalyst was removed by centrifugation and filtration. The reaction product with catalyst removed was then subjected to fractional distillation. Low boiling products and water were the first fractions of the distillate. The fraction distilling between 110° and 120° C. consisted of 13 grams of ethylenediamine, the fractions distilling between 140° and 167° C. consisted of 48 grams of mixture of piperazine, 2-methylpiperazine, and dimethylpiperazines which were separated and identified by the usual analytical methods and the fractions distilling between 167° and 175° C. consisted of 3.0 grams of ethanolamine and 2-aminopropanol. The residue (27 grams) was distilled at increasing temperatures and at reduced pressures. These high boiling fractions may be subjected to further isolation treatment, or advantageously recycled in the process of the invention such as will be described in Example 5 below.

In the above example and in the other examples of this specification the initial rate of hydrogen uptake was computed in accordance with the following formula:

(Volume of free space above liquid reaction mixture [1.7]) × (estimated pressure at approximately reaction temperature [3385] − pressure after short time interval [3250]) × (factor to convert time interval into hour [12]) 1.2 × (temperature in degrees Kelvin) × (kilograms of polyhydroxy alcohol [0.150])

*Example 2*

About 100 grams of corn starch, 50 grams of water, 314 grams of liquid anhydrous ammonia and 10 grams of Spongy nickel catalyst were charged into a pressure reactor having a free space above the liquid reaction mixture of 1.9 liters and which was equipped with agitation means. Hydrogen gas was introduced into the reactor after which the pressure of the system reached about 910 lbs. per sq. in. Heat was applied steadily until the reaction mixture acquired a temperature of about 246° C. At this temperature the pressure rose initially to about 3150 lbs. per sq. in., but had no reaction taken place during the time necessary to reach temperature of 252° C., it was estimated that the pressure would have been 3230 lbs. per sq. in. Five minutes later the temperature was 252° C. and the pressure 3200 lbs. per sq. in. This constituted an initial rate of hydrogen uptake of 12 moles of hydrogen per hour per kilogram of starch. The temperature was maintained at about 240°–250° C. and the mixture agitated for about 6 hours, during which time the pressure gradually decreased and finally became constant at approximately 2750 lbs. per sq. in. at 242° C. The reaction mixture was cooled to room temperature at which the pressure was 550 lbs. per sq. in., and the pressure released. The reaction product was subjected to fractional distillation in accordance with Example 1 beginning at atmospheric pressure and as the higher boiling fractions were collected, and distillation was continued under vacuum. The various fractions obtained were analyzed and among the important fractions of distillate there were found to be ethylenediamine, piperazine and 2-methylpiperazine.

*Example 3*

Proceeding in accordance with the process described in Example 1, about 50 grams of bagasse pith, 270 grams of concentrated aqueous ammonia, 310 grams of liquid ammonia, 30 grams of Spongy nickel catalyst, and hydrogen gas were charged into a pressure reactor having a free space of 1.9 liters above the liquid reaction mixture and reacted at a temperature of 245° C. for about 7 hours. The initial pressure within the reactor upon attaining a temperature of 248° C. was 3060 lbs. per sq. in. (no reaction having taken place) and 5 minutes later the pressure was 3040 lbs. per sq. in. at 248° C. The initial rate of hydrogen uptake was 14 moles of hydrogen per hour per kilogram of bagasse pith. The final pressure at 245° C. was 2760 lbs. per sq. in. The reaction products were found to be essentially the same as those obtained in Example 1 and they were isolated in substantially the same manner.

*Example 4*

By proceeding in accordance with the process described in Example 1, but employing 227 grams of glucose, 227 ml. of water, 320 grams of liquid anhydrous ammonia and 23 grams of Spongy nickel, and hydrogen gas, substantially the same reaction products were obtained. In this example the process was carried out in a pressure reaction vessel having a free space of 1.9 liters above the liquid reaction mixture for 3 hours at a temperature of 244° C. with the initial pressure of 3040 lbs. per sq. in at the reaction temperature and, had no reaction taken place while heating the reaction mixture to temperature 246° C., it was estimated that the pressure would have been 3066 lbs. per sq. in. Five minutes later the pressure was 3030 lbs. per sq. in. at 246° C. This constituted an initial rate of hydrogen uptake of 8.5 moles of hydrogen per hour for each kilogram of glucose. The final pressure was 2640 lbs. per sq. in. at 244° C.

Example 5

The high boiling fraction, having a boiling point in excess of 175° C., obtained in Example 1, was subjected to a repetition of the reductive aminolysis process of Example 1, using an equal weight of this material to replace the sucrose employed in that example and treated for 9 hours at a temperature of 220° C. and an initial pressure of 2960 lbs. per sq. in. This process constitutes a recycling of this material in the process of the invention. As a result of this recycling, additional yields of ethylenediamine, piperazine, 2-methylpiperazine, dimethylpiperazines, ethanolamine and a small amount of 2-aminopropanol were obtained.

Example 6

Proceeding in accordance with the process described in Example 1, but employing about 227 parts of sucrose, 227 parts of water, 300 parts of methylamine, 23 parts of Spongy nickel catalyst, and introducing hydrogen gas until a pressure of about 1970 lbs. per sq. in. was attained when the reaction vessel and its contents were heated to a temperature of 178° C., there was obtained after heating and agitating the mixture at 178° C. for 2 hours (at which time the final pressure was 920 lbs. per sq. in. at the reaction temperature) a resulting reaction mixture which, when subjected to distillation at atmospheric pressure and the distillate subjected to removal of the water by adding solid potassium hydroxide and redistilled, provided 24 parts of N,N'-dimethylethylenediamine, boiling at 117°–119° C. and 62 parts of N,N'-dimethypiperazine, boiling at 128°–131° C. The initial rate of hydrogen uptake in this example was 18 moles of hydrogen per hour per kilogram of sucrose.

Example 7

Proceeding in accordance with the process described in Example 1, but employing about 227 parts of sucrose, 275 parts of isopropanolamine, 300 parts of anhydrous liquid ammonia, 23 parts of Spongy nickel catalyst, hydrogen gas was introduced until a pressure of about 2720 lbs. per sq. in. was attained when the reaction vessel and its contents were heated to a temperature of 188° C. Had no reaction taken place it was estimated that the pressure would have been 2885 lbs. per sq. in. at 203° C. Five minutes later the pressure was 2600 lbs. per sq. in. at 203° C. The initial rate of hydrogen uptake was 43 moles of hydrogen per hour per kilogram of sucrose. There was obtained after heating and agitating the mixture at 200° C. for 1 hour (at which time the pressure was 1330 lbs. per sq. in. at the reaction temperature) a resulting reaction mixture which, when subjected to distillation at atmospheric pressure, provided 96 parts of a mixture of 2-methylpiperazine, 2,5-dimethylpiperazine and 2,6-dimethylpiperazine, having a boiling point range of 147°–162° C.

Example 8

Proceeding in accordance with the process described in Example 1, but employing about 227 parts of sucrose, 350 parts of propylenediamine, 300 parts of anhydrous liquid ammonia, 23 parts of Spongy nickel catalyst, hydrogen gas was introduced until a pressure of about 1290 lbs. per sq. in. was attained when the reaction vessel and its contents were heated to a temperature of 193° C. Had no reaction taken place it was estimated that the pressure would have been 1390 lbs. per sq. in. at 218° C. Fifteen minutes later the pressure was 950 lbs. per sq. in. at 218° C. The initial rate of hydrogen uptake was 23 moles of hydrogen per hour per kilogram of sucrose. There was obtained after heating and agitating the mixture at 200° C. for ¾ hour (at which time the pressure was 550 lbs. per sq. in. at the reaction temperature) a resulting reaction mixture which when subjected to distillation at atmospheric pressure, provided 205 parts of a mixture of 2-methylpiperazine, 2,5-dimethylpiperazine and 2,6-dimethylpiperazine, having a boiling point range of 153°–167° C.

Example 9

Proceeding in accordance with the process described in Example 1, but employing 228 grams of propylene glycol as the vicinal polyhydroxy compound, 300 grams of anhydrous ammonia, and 35 grams of a nickel catalyst of the Raney type, were charged into a rocking bomb of 2300 ml. capacity and hydrogen was admitted to a pressure of 1000 p.s.i. The reaction mixture was heated to 230–240° C. and maintained at this temperature for 3 hours. After cooling and venting, the contents of the bomb were removed and the liquid was separated from the catalyst by filtration. After removing ammonia and water by distillation to 100° C. the mixture was fractionally distilled in part at reduced pressure. There was obtained 90 grams of a white crystalline product boiling at 130°–180° C. consisting mainly of dimethylpiperazines. The remainder of the products was effectively recycled to yield additional amounts of piperazines.

Example 10

The procedure of Example 1 was repeated, employing, however, 114 grams (0.33 moles) of sucrose, 140 grams 20% aqueous ammonia (8.25 moles of $NH_3$) and 18 grams of Raney nickel catalyst. A starting pressure of hydrogen of 1200 lbs. per square inch gauge was employed (representing 6.65 moles of hydrogen per mole of sucrose). The final pressure was 780 lbs. per square inch gauge. The temperature of the reaction was maintained between about 170 and 187° C. A yield of mixed piperazines of approximately 27% based on weight of sucrose was obtained.

As will be apparent to those skilled in the art, other amines and vicinal polyhydroxy compounds may be employed in each of the foregoing examples. Thus, in each of the examples, equivalent amounts of ethylamine, ethanolamine, cyclohexylamine, aniline, etc., may be employed. In place of the polyhydroxy compounds employed, there may be used equivalent amounts of cellulose, pectin, fructose, glycerol, erythritol, sorbitol, mannitol, etc.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. In the process of producing piperazines by subjecting a saccharide to reductive aminolysis by the simultaneous action of a nitrogenous compound selected from the class consisting of ammonia and a basic saturated aliphatic primary amine and of hydrogen gas under a pressure of between about 750 and 15,000 pounds per square inch in the presence of a metal-containing hydrogenation catalyst, at a temperature of 150°–300° C., the improvement which comprises employing said hydrogenation catalyst in sufficient quantity to provide hydrogen absorption at a rate of at least 1 mole of hydrogen per hour per kilogram of saccharide and said nitrogenous compound being employed in an amount of at least one gram atom of nitrogen per carbon atom of saccharide starting material.

2. The process of claim 1, wherein the nitrogenous compound is employed in an amount of at least 1.2 gram atom of nitrogen per carbon atom of saccharide.

3. The process as defined by claim 1, wherein the piperazine product is recovered and is a member selected from the class consisting of piperazine, 2-methylpiperazine and dimethylpiperazines.

4. The process as defined by claim 1 wherein the nitrogenous compound is ammonia and the saccharide is sucrose and the mole ratio of the ammonia to sucrose is at least 14:1.

5. The process as defined by claim 1 wherein the nitrogenous compound is ammonia and the saccharide is sucrose and the mole ratio of the ammonia to sucrose is between about 20:1 and 30:1.

6. The process as defined by claim 1, wherein the saccharide is a polysaccharide selected from the class consisting of mono-, di- and poly-saccharides.

7. The process as defined by claim 1, wherein the catalyst is a Raney nickel catalyst.

8. The process as defined by claim 1, wherein the process is continued until a substantially constant pressure is obtained.

9. The process as defined by claim 1, wherein the saccharide is sucrose.

10. The process as defined by claim 1, wherein the saccharide is starch.

11. The process as defined by claim 1, wherein the saccharide is glucose.

12. The process as defined by claim 1, wherein the nitrogenous compound is a basic saturated aliphatic primary amine.

References Cited in the file of this patent

UNITED STATES PATENTS

| | | |
|---|---|---|
| 2,016,962 | Flint et al. | Oct. 8, 1935 |
| 2,754,330 | Schreyer | July 10, 1956 |

FOREIGN PATENTS

| | | |
|---|---|---|
| 449,474 | Great Britain | June 22, 1936 |

UNITED STATES PATENT OFFICE
CERTIFICATE OF CORRECTION

Patent No. 2,978,451            April 4, 1961

Henry B. Hass et al.

It is hereby certified that error appears in the above numbered patent requiring correction and that the said Letters Patent should read as corrected below.

Column 2, line 8, for "sctarting" read -- starting --; column 11, lines 10 and 11, strike out "selected from the class consisting of mono-, di- and poly-saccharides".

Signed and sealed this 3rd day of October 1961.

(SEAL)
Attest:

ERNEST W. SWIDER
Attesting Officer

DAVID L. LADD
Commissioner of Patents